United States Patent
Malmirchegini et al.

(10) Patent No.: US 9,801,080 B2
(45) Date of Patent: Oct. 24, 2017

(54) INTERFERENCE-AWARE FREQUENCY SELECTION FOR SMALL CELLS IN WIRELESS NETWORKS

(71) Applicant: QUALCOMM Incorporated, San Diego, CA (US)

(72) Inventors: Mehrzad Malmirchegini, San Diego, CA (US); Kausik Ray Chaudhuri, San Diego, CA (US); Rao Sanyasi Yenamandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 14/814,229

(22) Filed: Jul. 30, 2015

(65) Prior Publication Data

US 2016/0037525 A1    Feb. 4, 2016

Related U.S. Application Data

(60) Provisional application No. 62/031,604, filed on Jul. 31, 2014.

(51) Int. Cl.
| | |
|---|---|
| H04W 72/04 | (2009.01) |
| H04W 24/02 | (2009.01) |
| H04W 16/10 | (2009.01) |
| H04W 72/08 | (2009.01) |
| H04W 36/08 | (2009.01) |
| H04W 84/04 | (2009.01) |

(52) U.S. Cl.
CPC ........... *H04W 24/02* (2013.01); *H04W 16/10* (2013.01); *H04W 36/08* (2013.01); *H04W 72/082* (2013.01); *H04W 84/045* (2013.01)

(58) Field of Classification Search
CPC ... H04W 24/02; H04W 16/10; H04W 72/082; H04W 84/045; H04W 36/08; H04W 72/0453; H04W 88/02; H04W 16/14; H04W 16/16; H04W 72/0426; H04L 5/0073; H04J 11/0023
USPC ......................................................... 370/329
See application file for complete search history.

(56) References Cited

U.S. PATENT DOCUMENTS

| | | | |
|---|---|---|---|
| 9,084,129 B2 * | 7/2015 | Yanagisako ........... | H04W 24/02 |
| 2007/0042784 A1 * | 2/2007 | Anderson ............. | H04W 52/34 |
| | | | 455/450 |
| 2011/0081865 A1 * | 4/2011 | Xiao .................... | H04W 52/243 |
| | | | 455/63.1 |
| 2011/0222484 A1 * | 9/2011 | Pedersen ................. | H04L 5/001 |
| | | | 370/329 |
| 2012/0322435 A1 * | 12/2012 | Erceg ................ | H04W 72/0426 |
| | | | 455/418 |
| 2014/0036815 A1 | 2/2014 | Lei et al. | |
| 2014/0038627 A1 * | 2/2014 | Hu ........................ | H04L 5/0032 |
| | | | 455/452.1 |

(Continued)

*Primary Examiner* — Mark Rinehart
*Assistant Examiner* — Kenneth P Hunt
(74) *Attorney, Agent, or Firm* — Arent Fox, LLP

(57) ABSTRACT

Methods and apparatuses are provided for selecting an operating frequency from available frequencies/channels for a small cell. A set of candidate operating frequencies is determined from a plurality of available operating frequencies as having an interference cost less than a first threshold and a coupling cost less than a second threshold. The small cell can then select a candidate operating frequency of the set of candidate operating frequencies having a lowest interference cost as the operating frequency.

20 Claims, 8 Drawing Sheets

(56) References Cited

U.S. PATENT DOCUMENTS

| | | |
|---|---|---|
| 2014/0056250 A1 | 2/2014 | Cattoni et al. |
| 2014/0105122 A1* | 4/2014 | Zhang .................. H04W 16/06 |
| | | 370/329 |
| 2014/0153497 A1* | 6/2014 | Brisebois .............. H04W 28/18 |
| | | 370/329 |
| 2015/0003404 A1 | 1/2015 | Gokturk et al. |
| 2015/0079988 A1 | 3/2015 | Su et al. |

* cited by examiner

INTERFERENCE-AWARE FREQUENCY SELECTION FOR SMALL CELLS IN WIRELESS NETWORKS

CLAIM OF PRIORITY UNDER 35 U.S.C. §119

The present Application for Patent claims priority to Provisional Application No. 62/031,604 entitled "INTERFERENCE-AWARE FREQUENCY SELECTION FOR SMALL CELLS IN WIRELESS NETWORKS" filed Jul. 31, 2014, which is assigned to the assignee hereof and hereby expressly incorporated by reference herein.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional small cells can be deployed to provide more robust wireless coverage to mobile devices. Small cells use a network listening module (NLM) to measure received signal strength indication (RSSI) over one or more frequencies to select a frequency for operation. In some cases, the small cells also obtain a priority list from an operations, administration, and maintenance (OAM) function to additionally consider in selecting the operating frequency. In any case, the NLM is co-located at the small cell, however, and thus RSSI only to the small cell is considered in selecting the frequency. In this regard, frequency selection using an NLM does not consider impact of a selected frequency on any user equipment (UE) that may be served or potentially interfered by the small cell. In an example, selection of a frequency that is determined to be acceptable by the small cell may be a frequency over which a served UE experiences interference from other nearby cells (e.g., due to the different locations of small cell and UE). In addition, a frequency selected by the small cell may cause interference to nearby UEs served by another cell operating on the same frequency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, interference-aware frequency selection is described herein for small cells operating in wireless networks. For example, in selecting a frequency for operation, the small cells can consider interference of other cells caused to served user equipment (UE) in one or more frequencies as well as interference potentially caused by the small cell to one or more non-served UEs if a given frequency is selected. The small cell can select a frequency for operation based at least in part on one or more of these metrics.

According to an example, a method for selecting an operating frequency for a small cell is provided. The method includes determining, from a plurality of operating frequencies, a set of candidate operating frequencies based at least in part on an interference cost and a coupling cost associated with each candidate operating frequency of the plurality of operating frequencies, and selecting a candidate operating frequency of the set of candidate operating frequencies having a lowest interference cost as the operating frequency for the small cell.

In another example, an apparatus for selecting an operating frequency for a small cell is provided. The apparatus includes a candidate frequency determining component configured to determine, from a plurality of operating frequencies, a set of candidate operating frequencies based at least in part on an interference cost and a coupling cost associated with each candidate operating frequency of the plurality of operating frequencies, and a frequency selecting component configured to select a candidate operating frequency of the set of candidate operating frequencies having a lowest interference cost as the operating frequency for the small cell.

In another example, an apparatus for selecting an operating frequency for a small cell is provided. The apparatus includes means for determining, from a plurality of operating frequencies, a set of candidate operating frequencies based at least in part on an interference cost and a coupling cost associated with each candidate operating frequency of the plurality of operating frequencies, and means for selecting a candidate operating frequency of the set of candidate operating frequencies having a lowest interference cost as the operating frequency for the small cell.

In yet another example, a computer-readable medium comprising code executable by a computer for selecting an operating frequency for a small cell is provided. The code includes code for determining, from a plurality of operating frequencies, a set of candidate operating frequencies based at least in part on an interference cost and a coupling cost associated with each candidate operating frequency of the plurality of operating frequencies, and code for selecting a candidate operating frequency of the set of candidate operating frequencies having a lowest interference cost as the operating frequency for the small cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
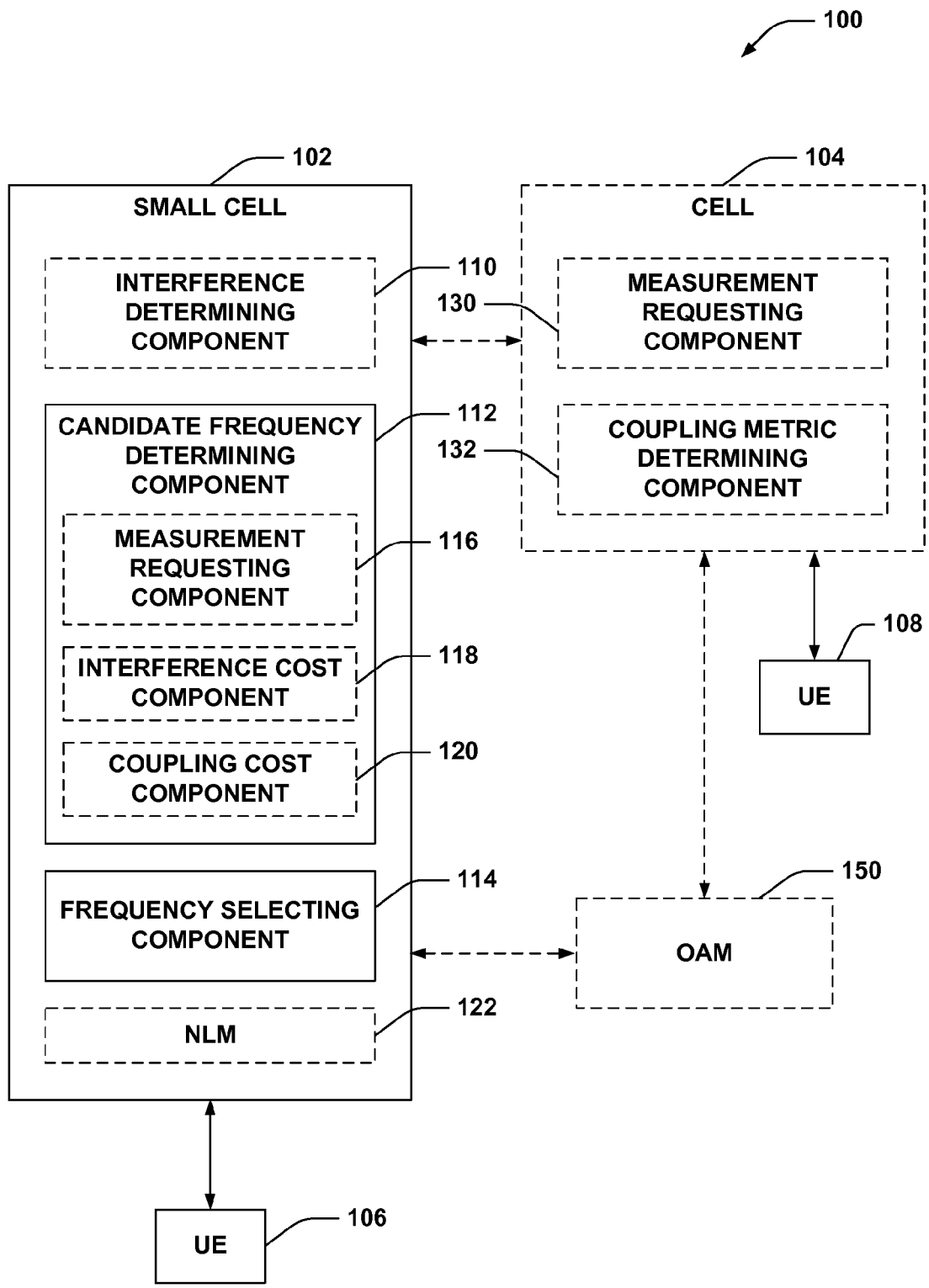
FIG. 1 is a block diagram of an example wireless communication system for selecting an operating frequency for a small cell.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Various aspects described herein relate to considering interference potentially caused to served and non-served user equipment (UE) in performing operating frequency selection at a small cell. For example, when the small cell determines to select a different frequency for operation, the small cell can receive inter-frequency measurement reports from its served UEs, and can determine a downlink interference cost associated with one or more frequencies based on the measurement reports. In addition, for example, the small cell can receive information regarding channel gain from UEs served by a neighboring small cell, and can determine a downlink coupling cost associated with one or more frequencies based on the channel gain information. Accordingly, the small cell can select an operating frequency that considers both the interference cost and coupling cost to improve interference consideration for served and non-served UEs.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a pico cell, a micro node, a micro cell, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

As used herein, the term "interference cost" is described in reference to specific example formulas, but is to be interpreted to refer to any representation of overall downlink interference received by UEs communicating with a small cell as a function of different available operating frequencies for the small cell. The downlink interference is measured by the UEs (e.g., as a reference signal received power (RSRP), reference signal received quality (RSRQ), or other measure of received signal strength indication (RSSI), etc. from one or more other cells or devices) on at least a portion of the available operating frequencies for the small cell.

Similarly, the term "coupling cost" is described in reference to specific example formulas, but is to be interpreted to refer to any representation of an amount of degradation in UE experience at a neighboring cell (e.g., how much interference the small cell can cause to UEs at the neighboring cell) if the small cell selects a certain frequency (e.g., the operating frequency of the neighboring cell). The degradation in UE experience can be proportional to the channel gain ratio measured by the UE from its neighboring cell to its serving small cell, and can be reported for multiple UEs of multiple neighboring cells on multiple frequencies. Channel gain measured by multiple UEs at the neighboring cell can be referred to as a coupling metric, such that multiple coupling metrics from multiple neighboring cells (or multiple instances of a coupling metric) can be used to compute a coupling cost for a related channel frequency.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A UE may comprise any type of mobile device, such as, but not limited to, a smartphone, cellular telephone, mobile phone, laptop computer, tablet computer, or other portable networked device that can be a standalone device, tethered to another device (e.g., a modem connected to a computer), wearable device (e.g. smart watch, smart glasses, smart wristband) and/or the like. In addition, a UE may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, a UE may be small and light enough to be considered portable and may be configured to communicate wirelessly via an over-the-air communication link using one or more OTA communication protocols described herein. Additionally, in some examples, a UE may be configured to facilitate communication on multiple separate networks via multiple separate subscriptions, multiple radio links, and/or the like.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example wireless communication system 100 for selecting an operating frequency for a small cell. System 100 includes a small cell 102 and/or one or more additional cells 104. Small cell 102 can serve one or more UEs 106, and other cells 104 can serve other UEs 108. As with "small cell," the term "cell" can be used to describe the access point that provides a cell, and/or a corresponding coverage area represented by the cell, where the cell may generally refer to, a macro cell, another small cell, or substantially any type of cell or related access point. As described, frequencies selected by small cell 102, though determined to be acceptable at small cell 102, can result in interference caused to served UEs 106 (e.g., where the selected frequency is used by another cell nearer to UE 106 than to small cell 102), and/or interference caused to UEs 108 not served by small cell 102 (e.g., where the selected frequency is used by the cell 104 for serving UE 108, and UE 108 is near small cell 102). Accordingly, small cell 102 can optionally include an interference determining component 110 for determining whether a current frequency of the small cell 102 results in interference to served UEs 106 that is more than a threshold level, a candidate frequency determining component 112 for determining a set of candidate frequencies for the small cell 102 based on an interference cost and coupling cost associated therewith, and a frequency selecting component 114 for selecting one of the set of candidate frequencies for operating the small cell 102.

Candidate frequency determining component 112 can optionally include, or be in communication with, a measurement requesting component 116 for requesting served UEs 106 to perform inter-frequency measurements and report measured signal strength over the frequencies, an interference cost component 118 for computing an interference cost associated with each of the frequencies for which measurements are reported, and/or a coupling cost component 120 for computing a coupling cost associated with each of the frequencies for which measurements are reported. Small cell 102 may optionally include a network listening module (NLM) 122 for measuring signals of neighboring cells. Additionally, cell 104 optionally includes a measurement requesting component 130 for requesting channel gain measurements from served UEs 108 between the cell 104 and small cell 102, and/or a coupling metric determining component 132 for determining one or more coupling metrics based on the channel gain measurements for providing to the small cell 102. System 100 can optionally include an operations, administration, and maintenance (OAM) 150 function or component to receive and/or report interference costs, coupling costs, coupling metrics, etc.

In addition, the components and functions represented by FIG. 1, as well as other components and functions described herein, may be implemented using any suitable means. Such means also may be implemented, at least in part, using corresponding structure as taught herein. For example, the components described above in conjunction with the components of FIG. 1 also may correspond to similarly designated "means for" functionality. Thus, in some aspects one or more of such means may be implemented using one or more of processor components, integrated circuits, or other suitable structure as taught herein.

Figure 2:
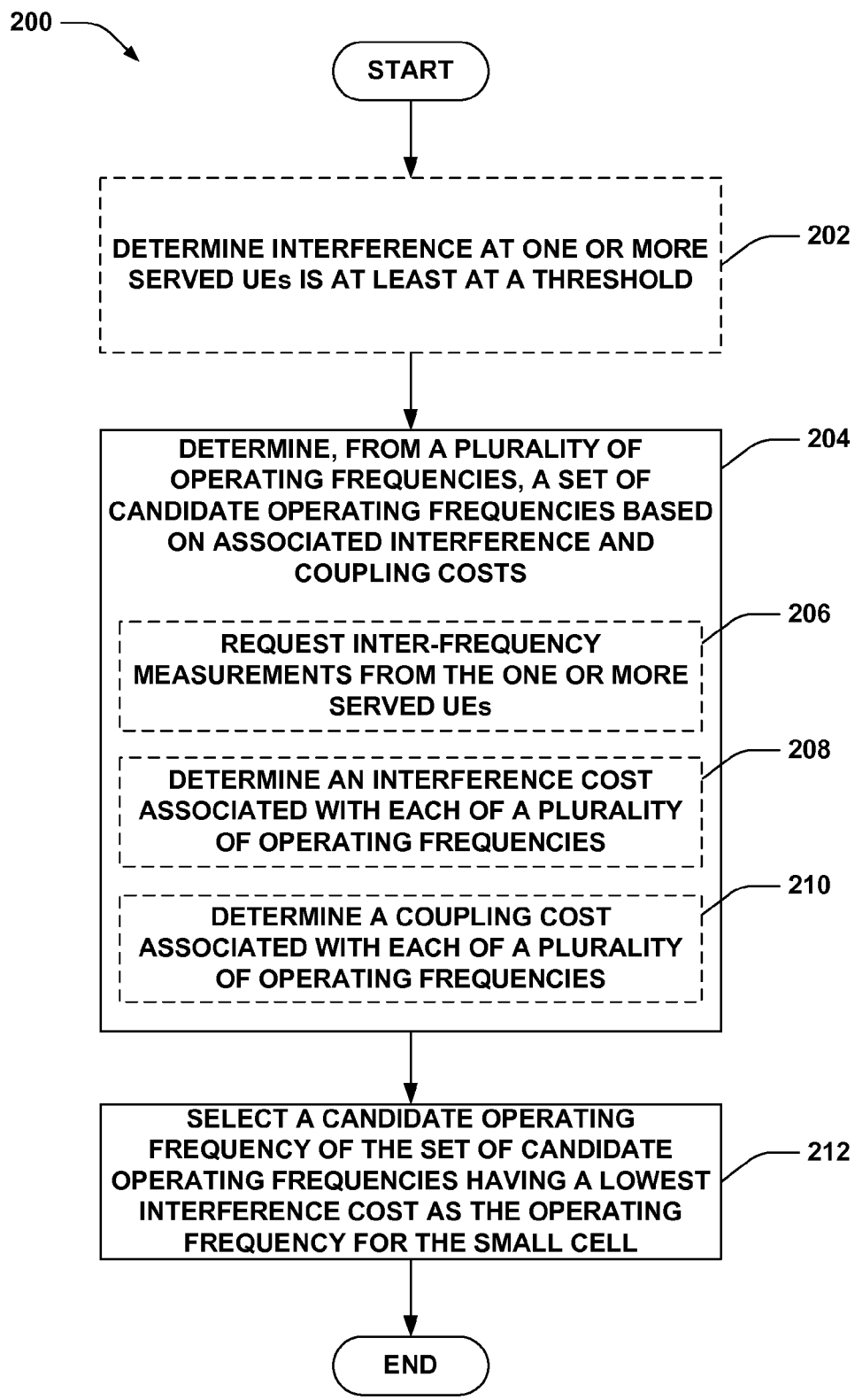
FIG. 2 is a flow chart of an aspect of an example methodology for selecting an operating frequency for a small cell.
Figure 3:
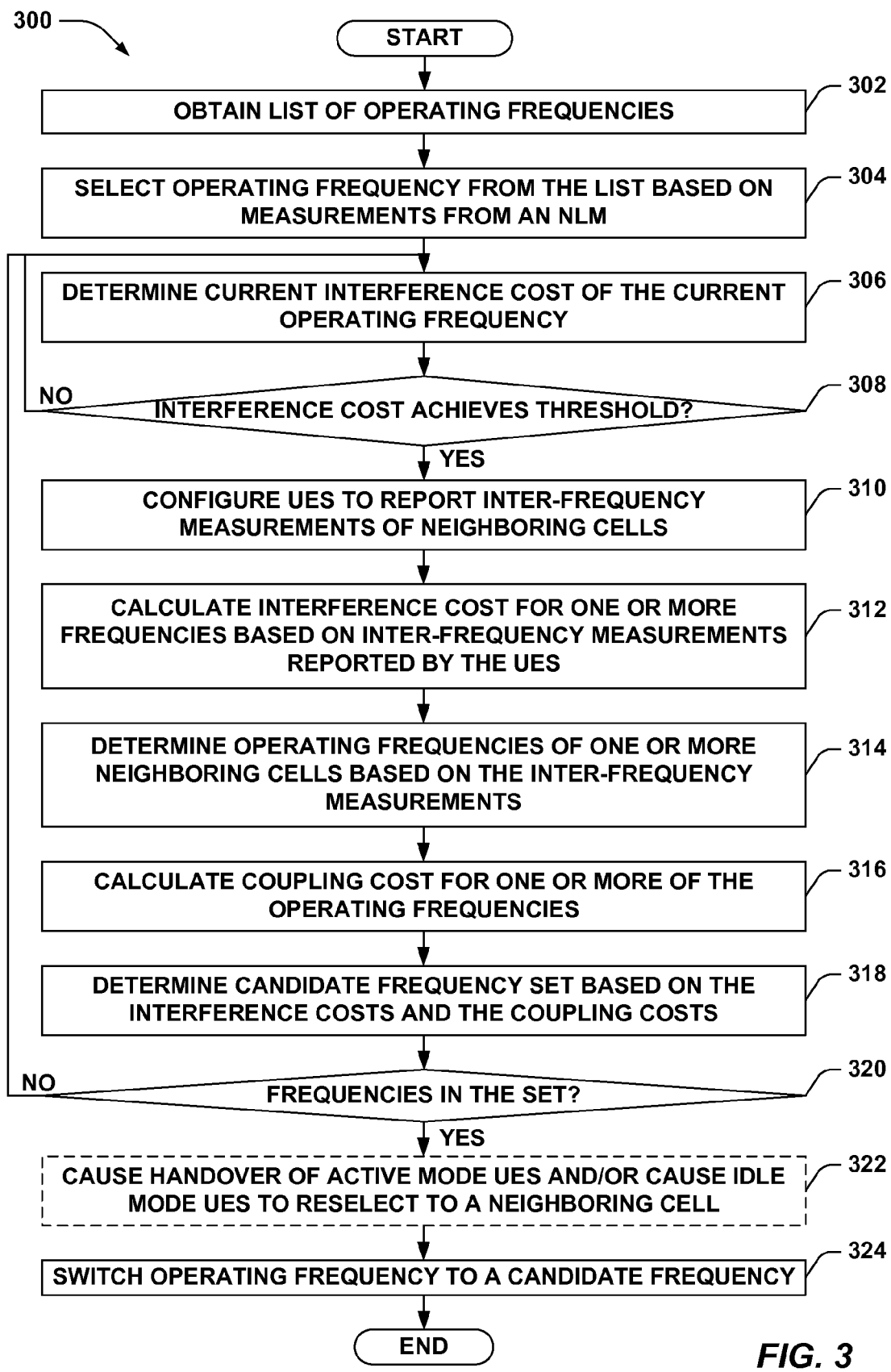
FIG. 3 is a flow chart of an aspect of an example methodology for selecting an operating frequency for a small cell.

Referring to FIGS. 1-3, aspects are depicted with reference to one or more components and one or more methods that may perform the actions or functions described herein. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions. Moreover, in an aspect, a component may be one of the parts that make up a system, may be hardware or software, and/or may be divided into other components.

FIG. 2 depicts an example method 200 for selecting an operating frequency for a small cell. Method 200 optionally includes, at Block 202, determining interference at one or more served UEs is at least at a threshold. Interference determining component 110 can determine the interference at the one or more served UEs 106 is at least at a threshold. For example, interference determining component 110 can receive intra-frequency measurement reports from UE 106 (e.g., periodically, upon request from the small cell 102 or other network component, etc.), which may be part of a handover procedure at the UE 106 or otherwise. The measurement reports may include one or more indications of signal strength measured of other cells on the operating frequency of the small cell 102 (e.g., RSRP, RSRQ, RSSI, etc.). In any case, interference determining component 110 can compare the measured signal strength of the one or more UEs 106 (e.g., or a function thereof) to a threshold to determine whether to consider selecting a different operating frequency such to improve communications at the UEs 106. In an example, interference determining component 110 determining the interference at Block 202 may include determining that the interference cost of the current operating frequency of small cell 102 is over a threshold, as described further below (e.g., as a function of reported signal strength measurements on the current operating frequency by served UEs 106). This may indicate that the interference cost of the current operating frequency may be higher than desired, and thus other operating frequencies may be considered for the small cell 102.

Method 200 also includes, at Block 204, determining, from a plurality of operating frequencies, a set of candidate operating frequencies based on associated interference and coupling costs. Candidate frequency determining component 112 can determine, from the plurality of operating frequencies, a set of candidate operating frequencies based on associated interference and coupling costs. For example, candidate frequency determining component 112 can compare the interference cost of the current operating frequency to interference costs of the plurality of operating frequencies to determine the set of one or more operating frequencies with an interference cost less than that of the current operating frequency. In addition, for example, candidate frequency determining component 112 may compare the current interference cost of the current operating frequency to the interference costs of the plurality of operating frequencies and a hysteresis value to prevent frequent operating frequency modification. For instance, candidate frequency determining component 112 may determine whether the difference between the interference cost of the current operating frequency and the interference cost of one or more of the plurality of operating frequencies modified by a hysteresis value (e.g., plus or minus the hysteresis value) achieves a threshold or not.

Furthermore, for example, determining the set of candidate operating frequencies can be based on comparing the coupling cost of the current operating frequency to the coupling costs of the plurality of operating frequencies to determine the set of operating frequencies with a coupling cost less than that of the current operating frequency. In any case, candidate frequency determining component 112 can determine the set of candidate operating frequencies based on one or more events (e.g., in response to determining the interference at least at the threshold at Block 202), in a periodic manner (e.g., based on a periodic timer initialized and managed by the small cell 102 for periodic measurement for selecting operating frequencies), and/or the like. In one example, where a periodic timer is used, a timer value can be configured in the small cell 102 (e.g., as received when provisioning on a wireless network, etc.). In another example, candidate frequency determining component 112 can determine the set of candidate operating frequencies based on determining that an interference cost of a current operating frequency achieves a threshold for at least a threshold duration of time (e.g., where the threshold duration of time may be configured in the small cell 102, provisioned by the wireless network, etc.). In this example, candidate frequency determining component 112 can initialize a timer upon determining that the current interference cost of the current operating frequency achieves the threshold, and can periodically measure the interference cost as the timer is running Where candidate frequency determining component 112 determines the current interference cost does not achieve the threshold while the timer is running, candidate frequency determining component 112 can stop the timer and continue using the current operating frequency. Where the timer expires before candidate frequency determining component 112 determines that the current interference cost no longer achieves the threshold, candidate frequency determining component 112 can stop the timer and continue with the Method 200, as described below, to potentially select a different operating frequency For example, Block 204 can optionally include, at Block 206, requesting inter-frequency measurements from the one or more served UEs. Measurement requesting component 116 can request the inter-frequency measurements from the one or more served UEs 106 by requesting that the UEs 106 perform inter-frequency measurements and report the results to small cell 102. For example, the request may indicate periodic measurements, a one-time measurement, etc. In addition, for example, the request may specify one or more measurement gaps during which the UEs 106 are to tune radio frequency (RF) resources away from the operating frequency of the small cell 102 such to measure the other frequencies. In addition, for example, the request may specify one or more frequencies to measure. The UEs 106 can accordingly tune to alternative frequencies to measure signal strength of signals received from other cells on the alternative frequencies, and can report the results to small cell 102. For example, measurement requesting component 116 can indicate the alternative frequencies for measurement to the UEs 106 based at least in part on frequencies specified in a priority list received from an OAM 150 at the small cell 102 (e.g., upon initially configuring small cell 102 on the network), frequencies specified in another configuration at the small cell 102, frequencies determined by the NLM as having parameters that achieve one or more thresholds, and/or the like.

Block 204 can also optionally include, at Block 208, determining an interference cost associated with each of a plurality of operating frequencies, which can be used in determining the set of candidate operating frequencies. Interference cost component 118 can determine the interference cost associated with each of the plurality of operating frequencies. As described, the plurality of operating frequencies may include at least a portion of the frequencies for which the UEs 106 reported signal strength measurements. Interference cost component 118 can determine the interference cost associated with a given one of the plurality of operating frequencies based at least in part on the signal strength measurements from one or more UEs 106 on the frequency. For example, interference cost component 118 can compute a function of the reported signal strengths (e.g., an average, maximum, etc.) reported by the UEs 106 for the frequency.

In a specific example, where $HeNB_i$ denotes the ith small cell which is operating at $l_i$ frequency and $UE_n^j$ represents the nth UE serving by the jth HeNB, $RSRP(HeNB_i, UE_n^j)$ and $RSRQ(HeNB_i, UE_n^j)$ represent the RSRP and RSRQ values measured by $UE_n^j$ with respect to $HeNB_i$. In this example, interference cost component 118 can characterize the downlink interference at $l_i$ frequency measured by $UE_n^j$ (denoted $Intf^{l_i}(UE_n^j)$) as follows:

$$Intf^{l_i}(UE_n^j) = \frac{N \times RSRP(HeNB_i, UE_n^j)}{RSRQ(HeNB_i, UE_n^j)}$$

where i≠j, and $$Intf^{l_i}(UE_n^j) = \frac{N \times RSRP(HeNB_1, UE_n^j)}{RSRQ(HeNB_1, UE_n^j)} - (n_{RS\_PRB} + (12 - n_{RS\_RBS}) \times L) \times N \times RSRP(HeNB_1, UE_n^j)$$

where i=j. In addition, in the above, N and $n_{RS\_PRB}$ represent the number of physical resource blocks (PRB) and the number of reference signals per PRB, respectively, and L denotes the PRB utilization of the serving small cell. Furthermore, in this calculation, there can be 12 subcarriers per each PRB. UE measurement reports can then be utilized to characterize the UE downlink interference per each frequency in this regard, and interference cost component 118 can utilize the downlink interference per served UE at the small cell to characterize the downlink interference cost per frequency at the small cell.

The downlink interference cost for a certain frequency at the small cell can be a predictive notion of overall downlink interference received by the served UEs 106 if the serving small cell 102 switches to that frequency. Thus, candidate frequency determining component 112 can consider the interference cost computed for each frequency by interference cost component 118 in determining the set of candidate frequencies. For example, as described further herein, candidate frequency determining component 112 may select a candidate frequency having the lowest interference cost as the new operating frequency, may ensure that at least one candidate frequency has an interference cost that is at least a threshold less than that of the current operating frequency, etc.

Block 204 can also optionally include, at Block 210, determining a coupling cost associated with each of a plurality of operating frequencies, which can be used in determining the set of candidate operating frequencies. Coupling cost component 120 can determine the coupling cost associated with each of the plurality of operating frequencies. As described, the plurality of operating frequencies may include at least a portion of the frequencies for which the UEs 106 reported signal strength measurements. Coupling cost component 120 can determine the coupling cost for a given one of the frequencies based at least in part on one or more coupling metrics received from one or more neighboring cells serving UEs on the frequency, and can thus also compute coupling costs for multiple frequencies that can be used in determining the set of candidate frequencies, as described herein. For example, coupling cost component 120 may periodically receive the one or more coupling cost metrics from the one or more neighboring cells, may request the one or more coupling cost metrics from the one or more neighboring cells based on determining to compute the coupling cost of the candidate operating frequencies and/or the like.

In a specific example, cell 104 can report coupling cost metrics related to its operating frequency over a backhaul connection (e.g., X2 connection) or other communication to the small cell 102. In this example, measurement requesting component 130 can request one or more downlink or uplink measurements from UEs 108 served by the cell 104, such as channel gain measurements (e.g., periodically, at the request of small cell 102 for the purpose of computing the coupling cost, etc.). For example, channel gain measurements can correspond to a channel gain observed by the UEs 108 of the cell 104 with respect to small cell 102 (e.g., RSRP/RSRQ measurements by the UEs 108). Coupling metric determining component 132 can accordingly compute a coupling cost metric for the operating frequency of the cell 104 based at least in part on a function of the channel gain measurements, and the cell 104 can report the coupling cost metric to the small cell 102.

For example, where $\gamma_{i,j,n}$ denotes the channel gain from the neighboring cell (e.g., small cell 102) to the serving cell (e.g., cell 104 for served UEs 108) observed by the nth UE of $HeNB_j$ with respect to the neighboring $HeNB_i$, coupling metric determining component 132 can define the coupling cost metric between the $HeNB_i$ and the $HeNB_j$ as:

$$CM_{i,j} = F\left(\bigcup_{m=1}^{N_j} \gamma_{i,j,m}\right)$$

where F is a general function of all channel gain ratios of UEs at the jth HeNB. It may be that $CM_{i,j}=0$ if the ith HeNB does not cause any interference on the UEs of the jth HeNB, if both HeNBs are operating at the same frequency. One possibility for the function F is the sum of the channel gain ratio of the UEs which are above a certain threshold. This metric can be characterized through the UE RSRP measurements reports and exchanged among the neighboring cells. Thus, coupling metric determining component 132 can report the coupling cost metric to small cell 102 (e.g., periodically, based on a request from small cell 102 or another component, based on occurrence of an event, etc.). In any case, coupling cost component 120 can compute the coupling cost for a given frequency based on multiple coupling cost metrics received from multiple cells operating on the given frequency. For example, coupling cost component 120 can compute the coupling cost of the ith HeNB with respect to the lth channel as follows:

$$\Delta_{i,j} = \sum_{j \in E_1 \setminus i} CM_{i,j}$$

where $E_l=\{u|HeNB_u$ is operating at lth channel$\}$ denote the set of indices of all cells operating at lth channel.

Though the method 200 is described as optionally including blocks for computing interference and coupling cost, it is to be appreciated that these metrics could be otherwise computed by other network devices and received by the small cell 102 (e.g., computed by an OAM 150 based on measurements provided thereto, etc.). In addition, the above formulas are examples of possible formulas for computing the interference cost and coupling cost associated with each frequency, and it is to be appreciated that other formulas or methods can be similarly used in this regard to obtain the interference and coupling costs. In any case, candidate frequency determining component 112 can determine the set of candidate frequencies as the operating frequencies having a lower interference cost and a lower coupling cost than a current operating frequency of small cell 102, the operating frequencies having an interference cost and/or coupling cost that is lower than the interference cost and/or coupling cost of the current operating frequency by at least one or more thresholds, the operating frequencies having an interference cost and/or coupling cost that is lower than a configured or determined threshold, etc. In this regard, for example, interference cost component 118 and coupling cost component 120 may similarly compute the interference cost and/or coupling cost for the current operating frequency of the small cell 102.

Method 200 also includes, at Block 212, selecting a candidate operating frequency of the set of candidate operating frequencies having a lowest interference cost as the operating frequency for the small cell. Frequency selecting component 114 can select the candidate operating frequency of the set of candidate operating frequencies having the lowest interference cost as the operating frequency for the small cell. The set of candidate operating frequencies can be the set determined by candidate frequency determining component 112, as described above. If candidate frequency determining component 112 was unable to determine a set of one or more candidate frequencies that satisfy one or more of the conditions described above (e.g., having a certain interference and/or coupling cost with respect to a current operating frequency, having a certain interference and/or coupling cost with respect to a threshold, etc.), for example, small cell 102 can continue operating using the current operating frequency. Where frequency selecting component 114 selects another operating frequency, however, frequency selecting component 114 can switch the operating frequency of the small cell 102 to the selected operating frequency.

In one example, frequency selecting component 114 can force handover of the served connected UEs 106 to other cells before switching the operating frequency to mitigate service interruption at the served UEs 106. This can include causing handover through backhaul communications with neighboring cells, adjusting handover parameters to cause the UEs 106 to handover to neighboring cells, etc. In addition, in an example, frequency selecting component 114 may perform similar procedures to cause idle UEs to reselect other cells before switching the operating frequency, such as adjusting idle mode parameters to cause the UEs to reselect to one or more neighboring cells.

FIG. 3 illustrates an example method 300 for managing an operating frequency of a small cell. Method 300 includes, at Block 302, obtaining a list of operating frequencies. Frequency selecting component 114 can obtain the list of operating frequencies. For example, frequency selecting component 114 may obtain the list of operating frequencies from a stored or received configuration (e.g., from OAM 150 at a power up state at the small cell 102, as part of small cell 102 connecting to the network, etc.). Method 300 may also include, at Block 304, selecting an operating frequency from the list based on measurements from an NLM. For example, the NLM 122 can measure signals of neighboring cells and/or other noise over one or more of the operating frequencies in the list, and frequency selecting component 114 can select an operating frequency from the list based on the measurement from the NLM 122. For example, frequency selecting component 114 can select the operating frequency with the lowest RSSI as measured by the NLM 122. In addition, for example, the OAM 150 may provide an ordered list of operating frequencies (e.g., a channel list) to the small cell 102 (e.g., when the small cell 102 powers up and/or registers with a network related to OAM 150), and frequency selecting component 114 may select an operating frequency based on the measurement from the NLM 122 and/or based on an ordering of the list (e.g., frequency selecting component 114 may select the first frequency in the prioritized list of operating frequencies that has an RSSI that is less than a threshold.

Method 300 may also include, at Block 306, determining a current interference cost of the current operating frequency. Interference cost component 118 can determine the current interference cost of the current operating frequency. As described, interference cost component 118 can determine the current interference cost based at least in part on reported measurements of the current operating frequency from one or more UEs (e.g., RSRP/RSRQ measurements from one or more served UEs 106) to characterize the downlink interference cost of the current operating frequency to the one or more UEs. In an example, the interference cost component 118 can compute the interference cost of the operating frequency using one or more of the formulas described above. In addition, for example, the interference cost component 118 may compute the interference cost of the current operating frequency as an average (e.g., mean, median, etc.), maximum, or other value of the reported interference measurements (e.g., RSRP/RSRQ, etc.) of the operating frequency. Method 300 may also include, at Block 308, determining whether the interference cost achieves a threshold. Interference cost component 118 can determine whether the interference cost achieves the threshold. As described further herein, it is to be appreciated that interference cost component 118 can compute and compare the interference cost of the current operating frequency to the threshold periodically such to ensure the operating frequency is suitable for serving the one or more UEs 106. For example, additional small cells may be added to the network, which may cause radio interference to the UEs 106 communicating with small cell 102, and measuring the interference cost of the current serving operating frequency periodically (and/or based on one or more detected events, such as NLM 122 detecting additional interference over the operating frequency) can ensure the small cell 102 is evaluating possible operating frequencies for serving its UEs 106. If the interference cost does not achieve the threshold, method 300 proceeds to Block 306 to again determine the current interference cost of the current operating frequency. As described, this may again occur according to a timer or other detected event.

If the interference cost does achieve the threshold, method 300 includes, at Block 310, configuring UEs to report inter-frequency measurements of neighboring cells. Interference cost component 118 can configure the UEs to report inter-frequency measurements of neighboring cells. For example, interference cost component 118 can request the UEs 106 to perform the inter-frequency measurements, which may include providing the UEs 106 with a list of operating frequencies to measure, measurement gaps representing time durations during which the UEs 106 are to tune RF resources away from small cell 102 to measure one or more of the operating frequencies, etc. UEs 106 can accordingly measure neighboring cells and provide measurement results to small cell 102. Method 300 also includes, at Block 312, calculating interference cost for one or more frequencies based on inter-frequency measurements reported by the UEs. Interference cost component 118 can calculate the interference cost for the one or more frequencies based on inter-frequency measurements reported by the UEs 106. As described, interference cost component 118 may calculate the interference cost for each of one or more frequencies for which measurement reports are received from the UEs 106 using one or more of the formulas described above.

Method 300 also includes, at Block 314, determining operating frequencies of one or more neighboring cells based on the inter-frequency measurements. Coupling cost component 120 may determine the operating frequencies of one or more neighboring cells based on the inter-frequency measurements. For example, coupling cost component 120 (or interference cost component 118 or other components of the candidate frequency determining component 112) may determine the operating frequencies based on the channel list received from the OAM 150, based on one or more operating frequencies discovered to have RSSI over a threshold by NLM 122, based on one or more frequencies received in measurement reports from the one or more UEs 106, etc. In any case, method 300 also includes, at Block 316, calculating coupling cost for one or more of the operating frequencies. Coupling cost component 120 may calculate the coupling cost for the one or more of the operating frequencies. As described above, coupling cost component 120 may calculate the coupling cost based on coupling cost metrics received from one or more neighboring cells or determined from information received from the one or more neighboring cells. For example, the coupling cost metrics may correspond to a channel gain from a neighboring cell (e.g., cell 104) to small cell 102 as observed by one or more UEs (which may be communicating with the cell 104, such as UEs 108). Thus, in one example, cell 104 can request that the UEs 108 report the channel gain based on a request from small cell 102 and/or may otherwise configure the UEs 108 for periodically reporting channel gain measurements. In any case, coupling cost component 120 can compute the coupling cost for each of the one or more operating frequencies observed of neighboring cells based at least in part on the received coupling cost metrics, which may include using one or more formulas described above.

Method 300 may also include, at Block 318, determining a candidate frequency set based on the interference costs and the coupling costs. Candidate frequency determining component 112 may determine the candidate frequency set based on the interference costs and the coupling costs. For example, candidate frequency determining component 112 may determine the candidate frequency set as the set of the operating frequencies that satisfy one or more constraints, which may include: 1) having a downlink interference cost less than that of the current operating frequency (e.g., plus or minus a hysteresis value or otherwise); 2) having a downlink coupling cost less than that of the current operating frequency (e.g., plus or minus a hysteresis value or otherwise); etc. Method 300 can include, at Block 320, determining whether there are frequencies in the set. Candidate frequency determining component 112 can determine whether there are frequencies in the set. If not, method 300 can proceed to Block 306 to determine a current interference cost of the current operating frequency (e.g., based on a periodic timer, detecting an event, etc.).

If there are frequencies in the set, method 300 may optionally include, at Block 322, causing handover of active mode UEs and/or causing idle mode UEs to reselect to a neighboring cell. Frequency selecting component may cause handover of the active mode UEs and/or may cause idle mode UEs to reselect to a neighboring cell. For example, the UEs 106 may include one or more active mode or idle mode UEs communicating with small cell 102. Before switching to another operating frequency, frequency selecting component 114 may cause intra-frequency or inter-frequency handover of active mode UEs to one or more neighboring cells (e.g., cell 104), which may include communicating with the one or more neighboring cells over a backhaul connection (e.g., X2 connection) to provide one or more parameters related to handing over the active mode UEs. In another example, frequency selecting component 114 may cause the handover by changing one or more parameters to cause the UE to handover to a neighboring cell. For example, frequency selecting component 114 may modify a CellIndividualOffset (CIO) parameter that is added to a signal power measurement of neighboring cells in determining whether to trigger an A3 event in LTE to handover to neighboring cells. Specifically, for example, frequency selecting component 114 may adjust the CIO parameter to favor neighbor cells. Moreover, for example, frequency selecting component 114 may similarly modify one or more idle mode parameters to cause idle mode UEs to reselect to one or more neighboring cells. In a specific example, frequency selecting component 114 may similarly update a Qoffset_s_n parameter and/or a Qoffset_frequency in a SIB message broadcast to various UEs such to favor neighbor cells. In either case, active mode UEs can handover to neighboring cells based on the adjusted parameters and/or idle mode UEs can reselect neighboring cells based on the adjusted parameters.

Method 300 also includes, at Block 324, switching the operating frequency to a candidate frequency. Frequency selecting component 114 can switch the operating frequency of small cell 102 to a candidate frequency in the set. For example, the candidate frequency may be a candidate frequency in the set determined by candidate frequency determining component 112 to have the lowest interference cost and/or lowest coupling cost. Once the small cell 102 is operating on the new frequency, frequency selecting component 114 may readjust parameters that were adjusted to cause handover/reselection of UEs 106 to facilitate handover and/or reselection of one or more of the UEs 106 to small cell 102. Though not shown, it is to be appreciated that the method 300 can then proceed to Block 306 to determine the current interference cost of the current operating frequency (e.g., periodically, based on one or more detected events, etc.) such that the initial operating frequency of the small cell may be selected based on NLM 122 measurements while subsequent operating frequencies are selected based on associated interference and/or coupling costs, as described.

Figure 4:
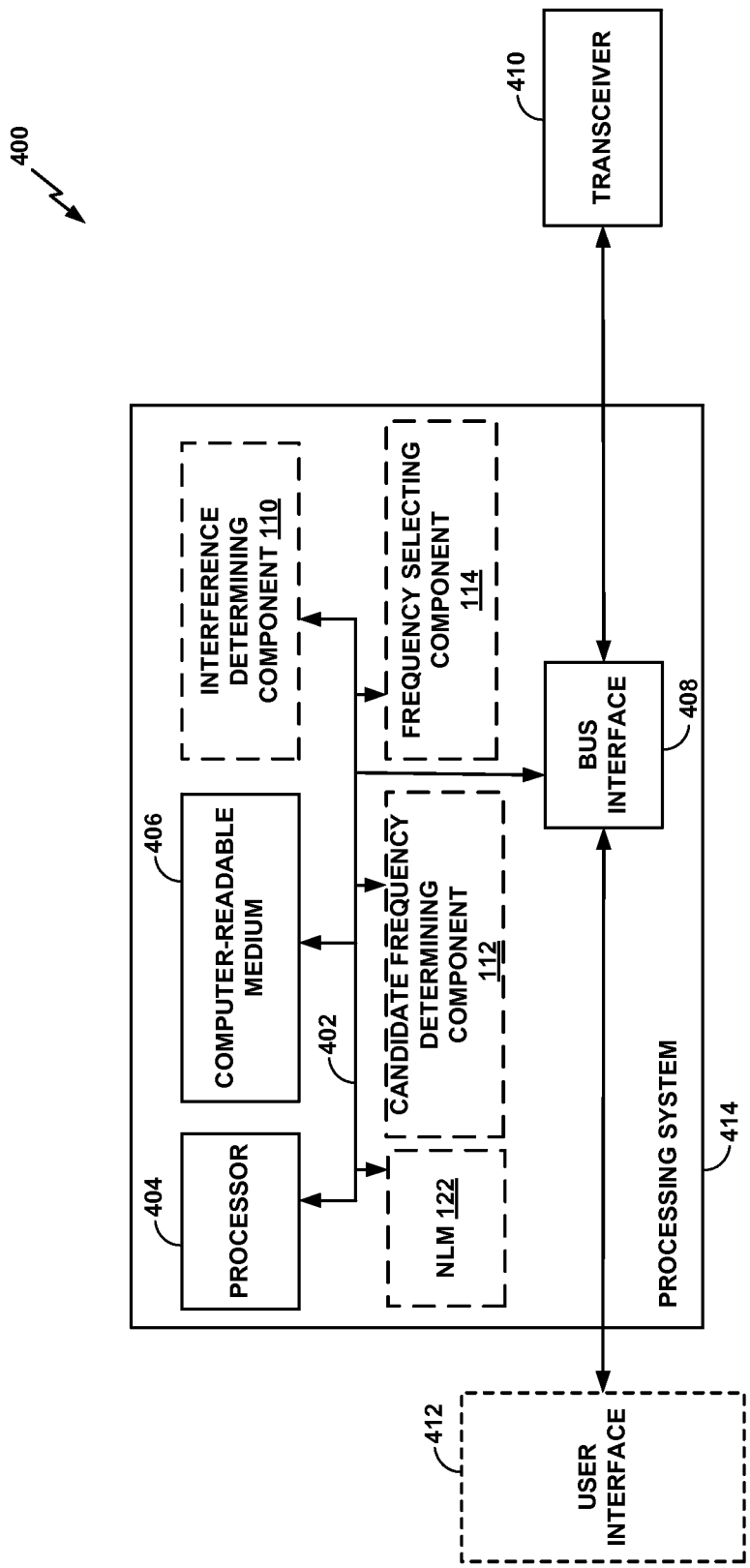
FIG. 4 is a block diagram of a hardware apparatus in accordance with various aspects set forth herein.

FIG. 4 is a conceptual diagram illustrating an example of a hardware implementation for an apparatus 400 employing a processing system 414 for selecting an operating frequency, as described herein. In some examples, the processing system 414 may comprise a small cell or a component of a small cell (e.g., small cell 102 of FIG. 1, etc.). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, interference determining component 110, candidate frequency determining component 112, frequency selecting component 114, NLM 122, components thereof, etc. (see FIG. 1), which may be configured to carry out one or more methods or procedures described herein.

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

In an aspect, processor 404, computer-readable medium 406, or a combination of both may be configured or otherwise specially programmed to perform the functionality of the interference determining component 110, candidate frequency determining component 112, frequency selecting component 114, NLM 122, components thereof, etc. (see FIG. 1), or various other components described herein. For example, processor 404, computer-readable medium 406, or a combination of both may be configured or otherwise specially programmed to perform the functionality of the interference determining component 110, candidate frequency determining component 112, frequency selecting component 114, NLM 122, components thereof, etc. described herein (e.g., the method 200 in FIG. 2, method 300 in FIG. 3, etc.), and/or the like.

Figure 5:
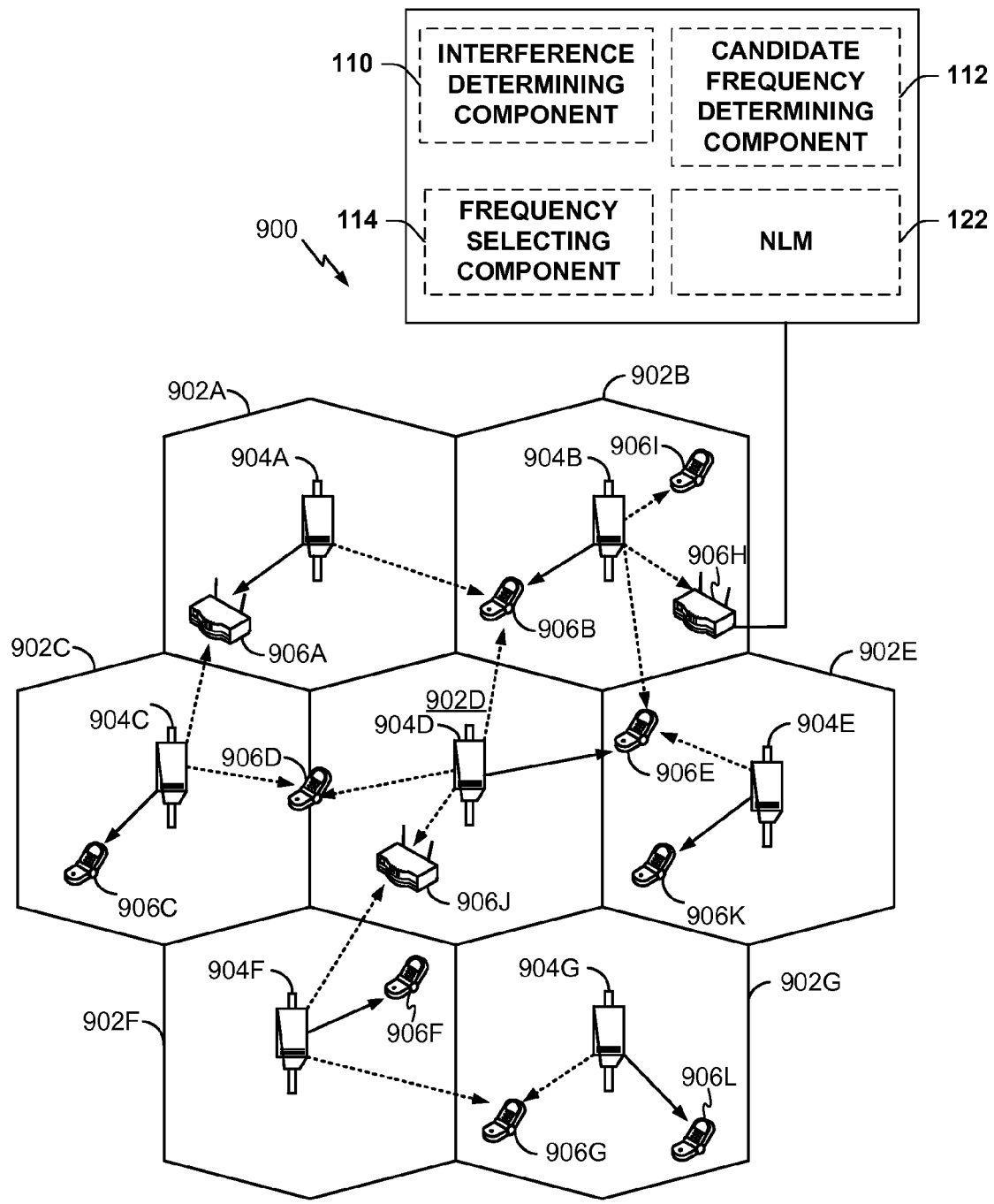
FIG. 5 is a simplified diagram of a wireless communication system.

FIG. 5 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). The cells 902A-902G may include cell 104, etc., in FIG. 1. As shown in FIG. 5, access terminals 906 (e.g., access terminals 906A-906L) may be dispersed at various locations throughout the system over time. The access terminals 906A-906L may include UEs 106, 108, etc., in FIG. 1. Each access terminal 906 may communicate with one or more access points 904 on a forward link (FL) and/or a reverse link (RL) at a given moment, depending upon whether the access terminal 906 is active and whether it is in soft handoff, for example. In an example, one or more of the access terminals 906 may include small cells (e.g., access terminal 906A, 906H, 906J), which may be small cell 102, and may thus include one or more of the components thereof (e.g., interference determining component 110, candidate frequency determining component 112, frequency selecting component 114, NLM 122, etc.) for performing functions described herein (e.g., one or more of method 200 in FIG. 2, method 300 in FIG. 3, etc.). The wireless communication system 900 may provide service over a large geographic region. For example, macro cells 902A-902G may cover a few blocks in a neighborhood or several miles in a rural environment.

Figure 6:
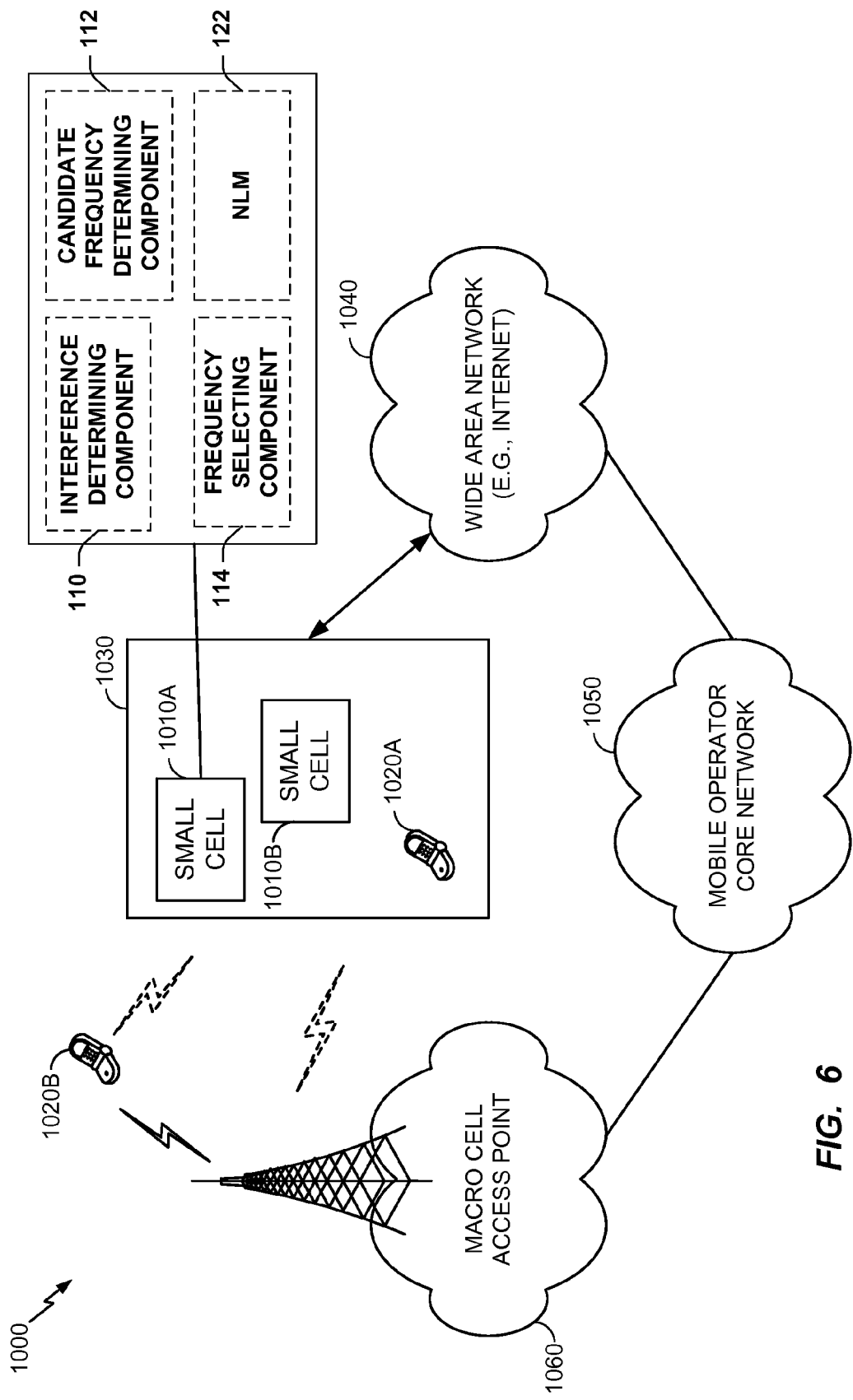
FIG. 6 is a simplified diagram of a wireless communication system including small cells.

FIG. 6 illustrates an example of a communication system 1000 where one or more small cells are deployed within a network environment. Specifically, the system 1000 includes multiple small cells 1010 (e.g., small cells 1010A and 1010B) installed in a relatively small scale network environment (e.g., in one or more user residences 1030). The small cells 1010A, 1010B can correspond to small cell 102, cell 104, etc., in FIG. 1, and thus may thus include one or more of the components thereof (e.g., interference determining component 110, candidate frequency determining component 112, frequency selecting component 114, NLM 122, etc.) for performing functions described herein (e.g., one or more of method 200 in FIG. 2, method 300 in FIG. 3, etc.). Each small cell 1010 may be coupled to a wide area network 1040 (e.g., the Internet) and a mobile operator core network 1050 via a DSL router, a cable modem, a wireless link, or other connectivity means (not shown). As will be discussed below, each small cell 1010 may be configured to serve associated access terminals 1020 (e.g., access terminal 1020A) and, optionally, other (e.g., hybrid or alien) access terminals 1020 (e.g., access terminal 1020B). Access terminals 1020A, 1020B can correspond to UEs 106, 108, etc., in FIG. 1, for example. In other words, access to small cells 1010 may be restricted whereby a given access terminal 1020 may be served by a set of designated (e.g., home) small cell(s) 1010 but may not be served by any non-designated small cells 1010 (e.g., a neighbor's small cell 1010).

Figure 7:
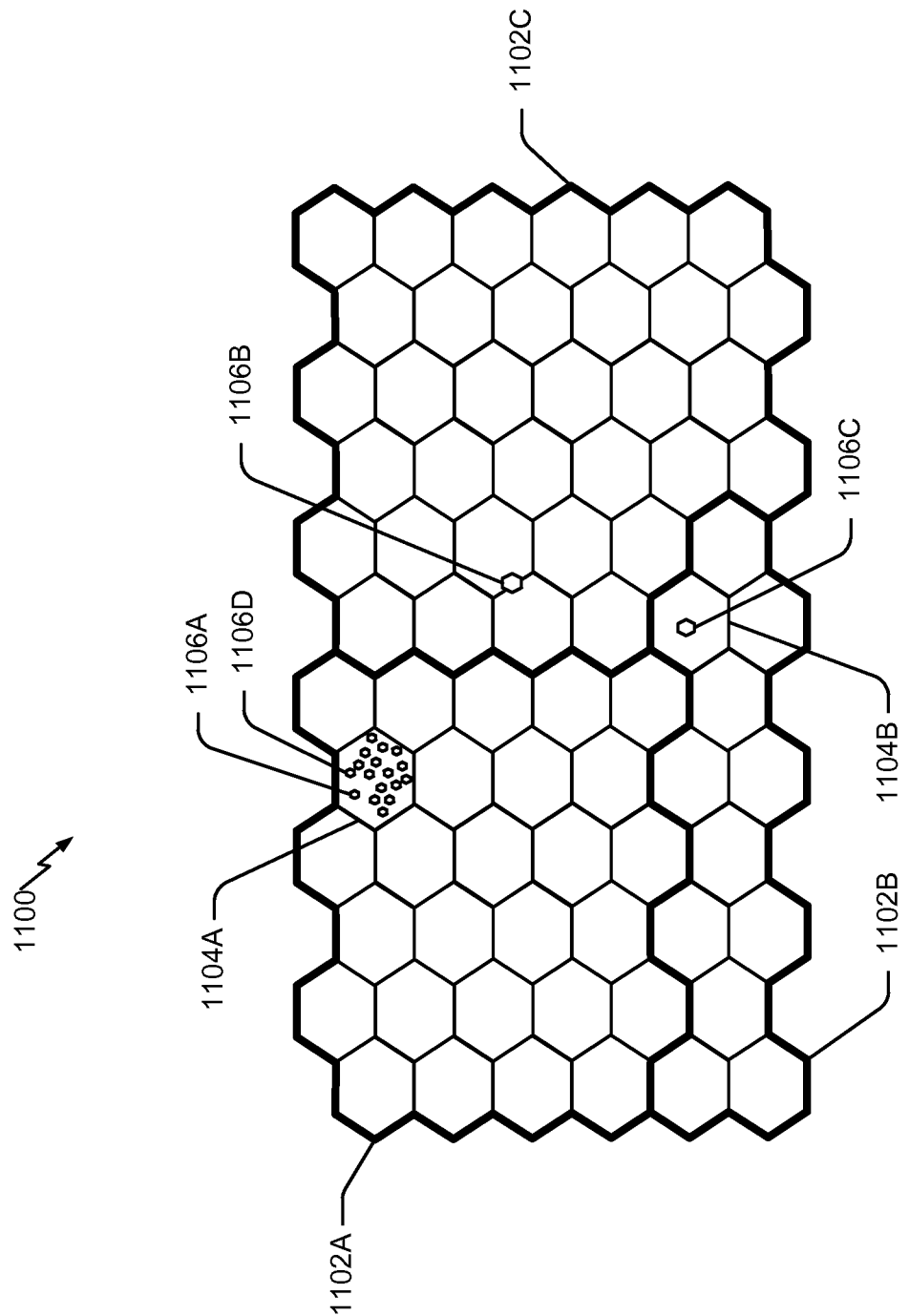
FIG. 7 is a simplified diagram illustrating coverage areas for wireless communication.

FIG. 7 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 might not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 6, the owner of a small cell 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of small cells 1010 (e.g., the small cells 1010A and 1010B that reside within a corresponding user residence 1030). For example, when a subscriber is outside his home, he is served by a standard macro access point (e.g., access point 1060) and when the subscriber is at home, he is served by a small cell (e.g., small cell 1010A). Here, a small cell 1010 may be backward compatible with legacy access terminals 1020.

A small cell 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred small cell (e.g., the home small cell of the access terminal 1020) whenever such connectivity is possible. For example, whenever the access terminal 1020A is within the user's residence 1030, it may be desired that the access terminal 1020A communicate only with the home small cell 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred small cell 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1010, the access terminal 1020 selects the small cell 1010 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1010 that reside within the corresponding user residence 1030). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
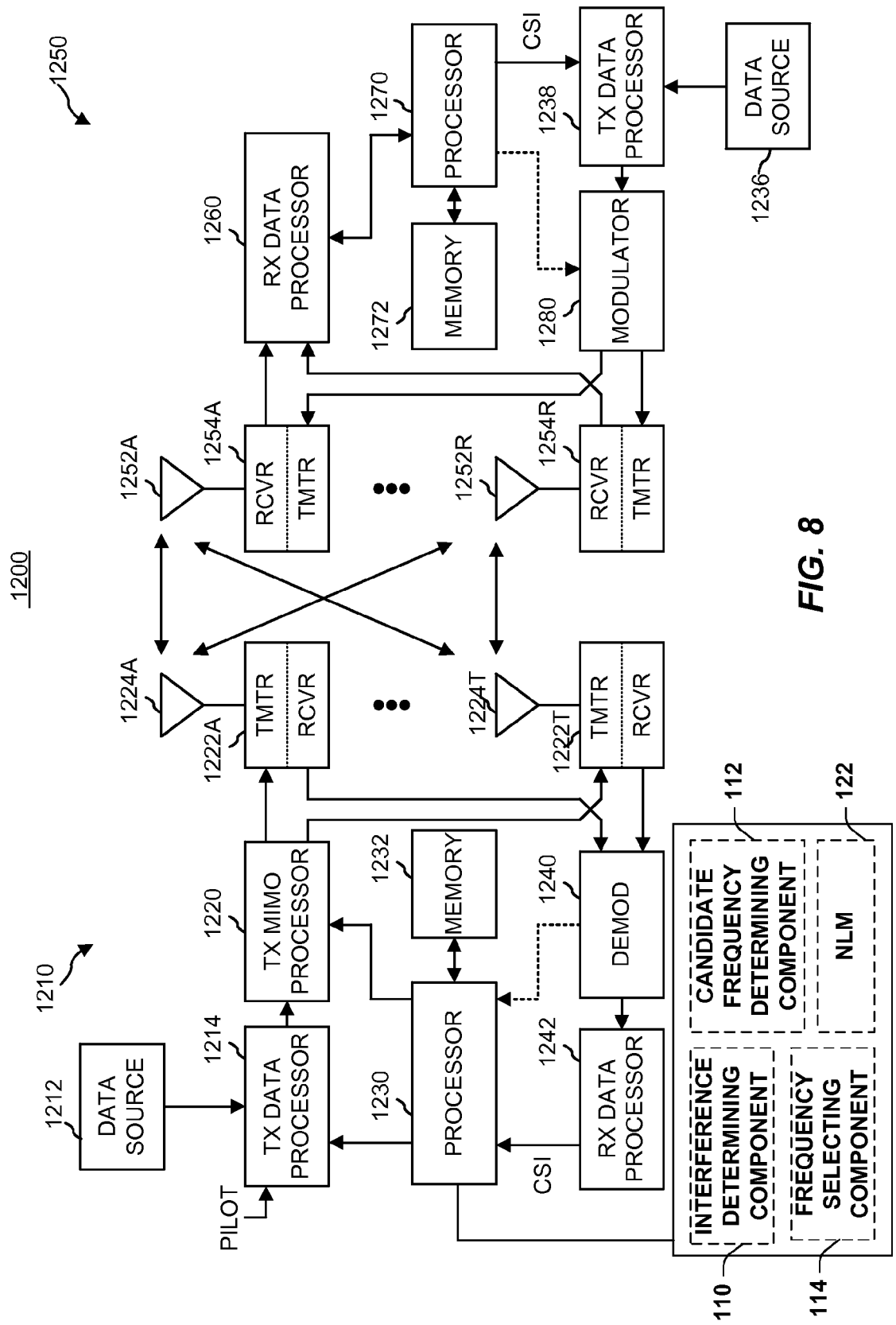
FIG. 8 is a simplified block diagram of several sample aspects of communication components.

FIG. 8 illustrates in more detail the components of a wireless device 1210 (e.g., a small cell, such as small cell 102 of FIG. 1) and a wireless device 1250 (e.g., a UE, such as UE 106 of FIG. 1) of a sample communication system 1200 that may be adapted as described herein. For example, wireless device 1210 may be a small cell 102, and may thus include one or more of the components thereof (e.g., interference determining component 110, candidate frequency determining component 112, frequency selecting component 114, NLM 122, etc.) for performing functions described herein (e.g., one or more of method 200 in FIG. 2, method 300 in FIG. 3, etc.). At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides NT modulation symbol streams to NT transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1222A through 1222T are then transmitted from NT antennas 1224A through 1224T, respectively.

At the device 1250, the transmitted modulated signals are received by NR antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the NR received symbol streams from NR transceivers 1254 based on a particular receiver processing technique to provide NT "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

It will be appreciated that for each device 1210 and 1250 the functionality of two or more of the described components may be provided by a single component. It will be also be appreciated that the various communication components illustrated in FIG. 7 and described above may be further configured as appropriate to perform communication adaptation as taught herein. For example, the processors 1230/1270 may cooperate with the memories 1232/1272 and/or other components of the respective devices 1210/1250 to perform the communication adaptation as taught herein.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for selecting an operating frequency for a small cell, comprising:
   determining, by the small cell, a coupling cost for at least a portion of a plurality of operating frequencies as a function of coupling metrics received from neighboring cells operating on at least the portion of the plurality of operating frequencies, wherein at least one of the coupling metrics relates to a channel gain from at least one of the neighboring cells to the small cell as measured by one or more user equipment (UE) served by the at least one of the neighboring cells;
   determining, by the small cell and from the plurality of operating frequencies, a set of candidate operating frequencies based at least in part on an interference cost and the coupling cost associated with each candidate operating frequency of the plurality of operating frequencies; and
   selecting, by the small cell, a candidate operating frequency of the set of candidate operating frequencies having a lowest interference cost as the operating frequency for the small cell.

2. The method of claim 1, further comprising determining a current interference cost of a current operating frequency of the small cell, wherein determining the set of candidate operating frequencies is performed based at least in part on determining the current interference cost.

3. The method of claim 2, further comprising initializing a timer based on determining the current interference cost is over a threshold, wherein determining the set of candidate operating frequencies is performed based on determining the current interference cost is over the threshold for at least a duration of the timer.

4. The method of claim 1, further comprising determining a current interference cost and a current coupling cost of a current operating frequency of the small cell, wherein determining the set of candidate operating frequencies comprises comparing the interference cost associated with each of the plurality of operating frequencies to the current interference cost and comparing the coupling cost associated with each of the plurality of operating frequencies to the current coupling cost.

5. The method of claim 1, further comprising determining the interference cost for at least the portion of the plurality of operating frequencies as a function of signal strengths of neighboring cells operating on at least the portion of the plurality of operating frequencies as measured by one or more other UEs served by the small cell.

6. The method of claim 5, further comprising determining the plurality of operating frequencies based at least in part on frequencies indicated in reports of signal strengths measured by the one or more other UEs.

7. The method of claim 1, wherein determining the coupling cost further comprises adding the coupling metrics received from the neighboring cells for each of the plurality of operating frequencies.

8. The method of claim 1, further comprising causing handover or reselection of one or more other UEs to a neighboring cell based at least in part on selecting the candidate operating frequency.

9. An apparatus for selecting an operating frequency for a small cell, comprising:
   a coupling cost component configured to determine a coupling cost for at least a portion of a plurality of operating frequencies as a function of coupling metrics received from neighboring cells operating on at least the portion of the plurality of operating frequencies, wherein at least one of the coupling metrics relates to a channel gain from at least one of the neighboring cells to the small cell as measured by one or more user equipment (UE) served by the at least one of the neighboring cells;
   a candidate frequency determining component configured to determine, from the plurality of operating frequencies, a set of candidate operating frequencies based at least in part on an interference cost and the coupling cost associated with each candidate operating frequency of the plurality of operating frequencies; and
   a frequency selecting component configured to select a candidate operating frequency of the set of candidate operating frequencies having a lowest interference cost as the operating frequency for the small cell.

10. The apparatus of claim 9, further comprising an interference determining component configured to determine a current interference cost of a current operating frequency of the small cell, wherein the candidate frequency determining component is configured to determine the set of candidate operating frequencies based at least in part on the current interference cost.

11. The apparatus of claim 10, wherein the interference determining component is further configured to initialize a timer based on determining the current interference cost is over a threshold, and wherein the candidate frequency determining component is configured to determine the set of candidate operating frequencies based on the interference determining component determining the current interference cost is over the threshold for at least a duration of the timer.

12. The apparatus of claim 9, further comprising:
   an interference cost component configured to determine a current interference cost of a current operating frequency of the small cell,
   wherein the coupling cost component is configured to determine a current coupling cost of the current operating frequency of the small cell,
   wherein the candidate frequency determining component is configured to determine the set of candidate operating frequencies at least in part by comparing the interference cost associated with each of the plurality of operating frequencies to the current interference cost and comparing the coupling cost associated with each of the plurality of operating frequencies to the current coupling cost.

13. The apparatus of claim 9, further comprising an interference cost component configured to determine the interference cost for at least the portion of the plurality of operating frequencies as a function of signal strengths of neighboring cells operating on at least the portion of the plurality of operating frequencies as measured by one or more other UEs served by the small cell.

14. The apparatus of claim 13, wherein the interference cost component is further configured to determine the plurality of operating frequencies based at least in part on frequencies indicated in reports of signal strengths measured by the one or more other UEs.

15. The apparatus of claim 9, wherein the coupling cost component is configured to determine the coupling cost at least in part by adding the coupling metrics received from the neighboring cells for each of the plurality of operating frequencies.

16. The apparatus of claim 9, wherein the frequency selecting component is further configured to cause handover or reselection of one or more other UEs to a neighboring cell based at least in part on selecting the candidate operating frequency.

17. A non-transitory computer-readable medium comprising code executable by a computer for selecting an operating frequency for a small cell, the code comprising:
  code for determining, by the small cell, a coupling cost for at least a portion of a plurality of operating frequencies as a function of coupling metrics received from neighboring cells operating on at least the portion of the plurality of operating frequencies, wherein at least one of the coupling metrics relates to a channel gain from at least one of the neighboring cells to the small cell as measured by one or more user equipment (UE) served by the at least one of the neighboring cells;
  code for determining, by the small cell and from the plurality of operating frequencies, a set of candidate operating frequencies based at least in part on an interference cost and the coupling cost associated with each candidate operating frequency of the plurality of operating frequencies; and
  code for selecting, by the small cell, a candidate operating frequency of the set of candidate operating frequencies having a lowest interference cost as the operating frequency for the small cell.

18. The non-transitory computer-readable medium of claim 17, further comprising code for determining a current interference cost of a current operating frequency of the small cell, wherein determining the set of candidate operating frequencies is performed based at least in part on determining the current interference cost.

19. The non-transitory computer-readable medium of claim 17, further comprising code for determining a current interference cost and a current coupling cost of a current operating frequency of the small cell, wherein the code for determining the set of candidate operating frequencies compares the interference cost associated with each of the plurality of operating frequencies to the current interference cost and compares the coupling cost associated with each of the plurality of operating frequencies to the current coupling cost.

20. The non-transitory computer-readable medium of claim 17, further comprising code for determining the interference cost for at least the portion of the plurality of operating frequencies as a function of signal strengths of neighboring cells operating on at least the portion of the plurality of operating frequencies as measured by one or more other UEs served by the small cell.

* * * * *